(12) United States Patent
Shibao (10) Patent No.: US 11,128,747 B2
(45) Date of Patent: Sep. 21, 2021

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Mayumi Shibao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/228,240

(22) Filed: Dec. 20, 2018

(65) Prior Publication Data

US 2020/0092409 A1    Mar. 19, 2020

Related U.S. Application Data

(63) Continuation of application No. 15/263,150, filed on Sep. 12, 2016, now Pat. No. 10,171,644.

(30) Foreign Application Priority Data

Sep. 17, 2015 (JP) .................. 2015-184527

(51) Int. Cl.
| | |
|---|---|
| *H04M 1/725* | (2006.01) |
| *H04M 1/72412* | (2021.01) |
| *H04W 8/00* | (2009.01) |
| *H04N 1/327* | (2006.01) |
| *H04N 1/32* | (2006.01) |
| *H04N 1/00* | (2006.01) |
| *H04M 1/72415* | (2021.01) |
| *H04W 84/12* | (2009.01) |

(52) U.S. Cl.
CPC ... *H04M 1/72412* (2021.01); *H04M 1/72415* (2021.01); *H04N 1/00307* (2013.01); *H04N 1/32117* (2013.01); *H04N 1/32765* (2013.01); *H04W 8/005* (2013.01); *H04M 2250/02* (2013.01); *H04M 2250/06* (2013.01); *H04N 2201/006* (2013.01); *H04N 2201/0041* (2013.01); *H04N 2201/0055* (2013.01); *H04N 2201/0094* (2013.01); *H04N 2201/3205* (2013.01); *H04W 84/12* (2013.01)

(58) Field of Classification Search
CPC .................. H04M 1/7253; H04N 1/00307
See application file for complete search history.

(56) References Cited

U.S. PATENT DOCUMENTS

| | | | | |
|---|---|---|---|---|
| 2008/0074560 | A1* | 3/2008 | Ichieda | H04N 9/3147 348/739 |
| 2014/0253965 | A1 | 9/2014 | Asai | |
| 2015/0103708 | A1* | 4/2015 | Kang | H04W 72/0433 370/311 |

FOREIGN PATENT DOCUMENTS

| | | |
|---|---|---|
| CN | 1832366 A | 9/2006 |
| CN | 102546851 A | 7/2012 |
| CN | 102571743 A | 7/2012 |

(Continued)

*Primary Examiner* — Tuan H Nguyen
(74) *Attorney, Agent, or Firm* — Canon U.S.A., Inc. I.P. Division (57) ABSTRACT

A communication apparatus searches for a device using a first wireless communication, instructs, using the first wireless communication, a device selected from a list based the result of the search to operate in an access point mode, obtains, using the first wireless communication, connection information from the device operating in the access point mode, establishes a second wireless connection with the device based on the obtained connection information.

25 Claims, 10 Drawing Sheets (56) References Cited

FOREIGN PATENT DOCUMENTS

| | | | |
|---|---|---|---|
| CN | 103795882 | A | 5/2014 |
| CN | 104683938 | A | 6/2015 |
| CN | 104735814 | A | 6/2015 |
| CN | 104754496 | A | 7/2015 |
| EP | 2863705 | A1 | 4/2015 |
| EP | 2891973 | A1 | 7/2015 |
| JP | 2009194874 | A | 8/2009 |
| JP | 2011159095 | A | 8/2011 |
| JP | 2015-073231 | A | 4/2015 |
| KR | 10-2001-0087841 | A | 9/2001 |
| KR | 20140132106 | A | 11/2014 |
| KR | 10-2015-0043793 | A | 4/2015 |
| KR | 10-2015-0044330 | A | 4/2015 |
| KR | 20150100526 | A | 9/2015 |
| KR | 10-2014-0132106 | A | 8/2016 |
| KR | 10-2015-0100526 | A | 8/2017 |

\* cited by examiner

DEVICE LIST TABLE 500

| DEVICE NAME | MAC ADDRESS | IP ADDRESS | CAPABILITY INFORMATION |
|---|---|---|---|
| Printer-001 | 12:34:56:78:9a:bc | 172.24.11.1 | COLOR/TWO-SIDED |
| Printer-002 | 12:34:56:78:ab:cd | 172.24.22.2 | COLOR/ONE-SIDED |
| Printer-003 | 12:34:56:7a:bc:de | 172.24.33.3 | MONOCHROME/TWO-SIDED |
| Printer-004 | 12:34:56:ab:cd:ef | 172.24.44.4 | MONOCHROME/ONE-SIDED |

SEARCH RESULT TABLE
800

| DEVICE NAME | MAC ADDRESS | IP ADDRESS | CAPABILITY INFORMATION |
|---|---|---|---|
| Printer-001 | 12:34:56:78:9a:bc | 172.24.11.1 | COLOR/TWO-SIDED |
| Printer-005 | 12:34:5a:bc:de:fg | — | — |
| Printer-006 | 12:34:ab:cd:ef:gh | — | — |

FIG. 9

COMMUNICATION APPARATUS, METHOD FOR CONTROLLING COMMUNICATION APPARATUS, AND STORAGE MEDIUM

CROSS-REFERENCE TO RELATED APPLICATIONS

This is a continuation application of U.S. patent application Ser. No. 15/263,150 which will issue as U.S. Pat. No. 10,171,644 on Jan. 1, 2019 which claims the benefit of Japanese Patent Application No. 2015-184527, filed Sep. 17, 2015, both of which are hereby incorporated by reference herein in their entirety.

BACKGROUND

Field

Aspects of the present invention generally relate to a communication apparatus and a method for controlling the communication apparatus.

Description of the Related Art

Communication apparatuses such as a smartphone and a tablet personal computer (PC) include a wireless communication function. Examples of uses of the wireless communication function include transmitting a picture and/or an electronic document stored in a communication apparatus to a printing apparatus to print the picture and/or electronic document with the printing apparatus.

In transmitting print data from a communication apparatus such as a smartphone or a tablet PC to a printing apparatus by using the wireless communication function, the user needs to select a printing apparatus on the communication apparatus. There is known a method for selecting a printing apparatus in which the communication apparatus manages a plurality of printing apparatuses in the form of a device list, and the user selects a desired printing apparatus from the device list.

Japanese Patent Application Laid-Open No. 2001-125761 discusses a technique for searching for printing apparatuses capable of executing printing based on given print settings, and excluding printing apparatuses unable to execute the printing based on the print settings from the search results.

A conventional communication apparatus searches for surrounding devices via a wireless local area network (LAN) function (e.g., Wi-Fi®), and manages the searched devices in the form of a device list. As a wireless communication standard, Bluetooth® low energy (BLE) is formulated in the Bluetooth® 4.0 standard. BLE enables operation with reduced power consumption and thus is attracting attention from the viewpoint of power saving.

The use of BLE for a device search can reduce power consumption of both the communication apparatus and the devices. However, BLE may not be suitable for the acquisition of some types of information needed for the device list. For example, if the information needed for the device list has been obtained by using Simple Network Management Protocol (SNMP), the same information may be unobtainable by BLE.

SUMMARY

According to an aspect of the present invention, a communication apparatus includes a search unit configured to search for a device using a first wireless communication, a display unit configured to display a result of the search, an instruction unit configured to instruct, using the first wireless communication, a device selected from the result of the search to operate in an access point mode, an obtaining unit configured to obtain, using the first wireless communication, connection information from the device operating in the access point mode, and a communication unit configured to establish a second wireless connection with the device based on the obtained connection information.

Further features of aspects of the present invention will become apparent from the following description of exemplary embodiments with reference to the attached drawings.

DESCRIPTION OF THE EMBODIMENTS

Exemplary embodiments of the present invention will be described below with reference to the drawings. The following exemplary embodiments are not intended to limit the aspects of the invention set forth in the claims. Not all combinations of features described in the exemplary embodiments are indispensable to implementing the aspects of the present invention.

Figure 1:
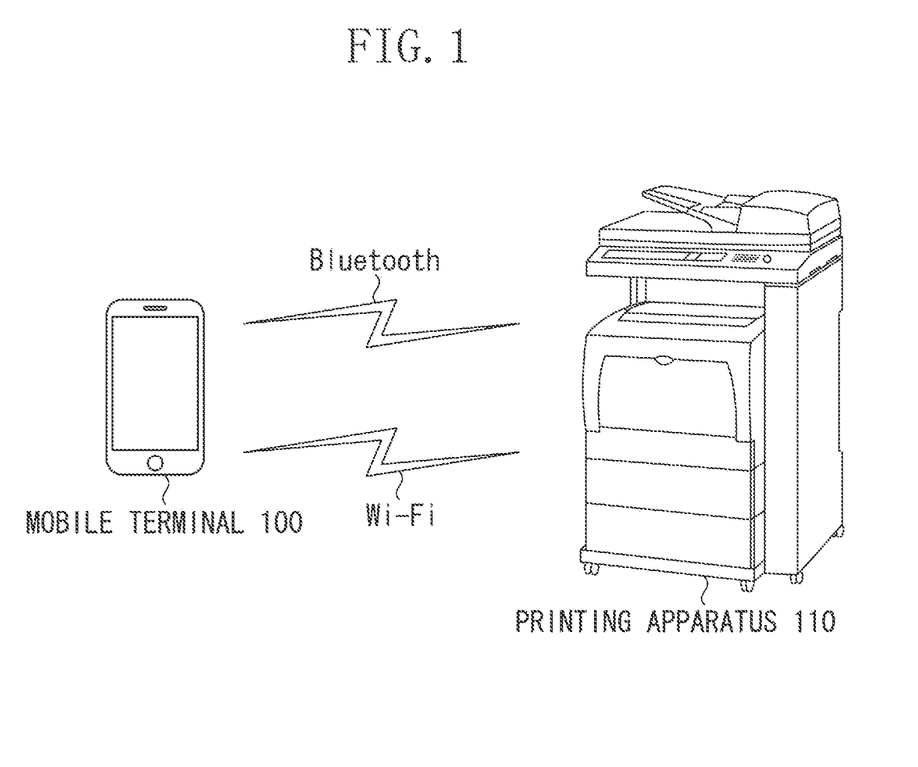
FIG. 1 is a diagram illustrating an outline of a communication system.

Referring to FIG. 1, a configuration of a communication system according to a first exemplary embodiment will be described. The communication system according to the present exemplary embodiment includes a mobile terminal 100 and a printing apparatus 110.

The mobile terminal 100 and the printing apparatus 110 can communicate by using two types of wireless communication functions, Wi-Fi® and Bluetooth®. In the present exemplary embodiment, the Bluetooth® communication is based on the BLE standard. In the Wi-Fi® communication, the printing apparatus 110 operates as a software access point so that the mobile terminal 100 and the printing apparatus 110 perform direct wireless communication by using a wireless LAN function without the intervention of an external relay apparatus such as an access point. In the following description, operating as a software access point will be referred to as an access point mode.

Details of processing associated with the present exemplary embodiment will be described with reference to the drawings and flowcharts described below. Briefly, the mobile terminal 100 performs a device search by using Bluetooth® (BLE) and presents search results to a user. The user selects a desired device from the search results. The mobile terminal 100 obtains information (device information) about the device selected by the user via Wi-Fi®, and registers the obtained device information in a device list.

Figure 2:
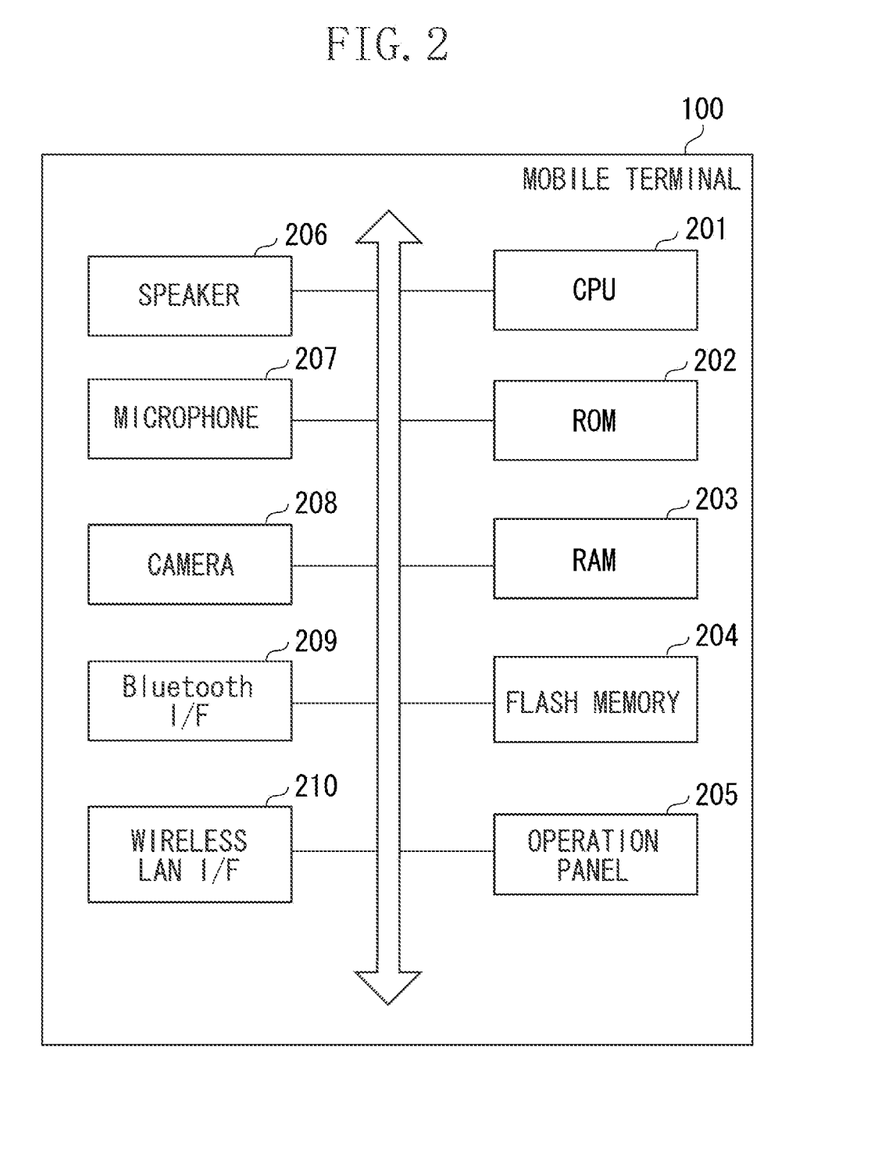
FIG. 2 is a block diagram illustrating a hardware configuration of a mobile terminal.

Referring to FIG. 2, a hardware configuration of the mobile terminal 100 will be described. The mobile terminal 100 according to the present exemplary embodiment is assumed to be a smartphone or a tablet PC. However, the smartphone and the tablet PC are just examples of a communication apparatus capable of executing wireless communication, and other devices can be used.

A central processing unit (CPU) 201 reads a control program stored in a read-only memory (ROM) 202 and executes various types of processing for controlling an operation of the mobile terminal 100. The ROM 202 stores the control program. A random access memory (RAM) 203 is used as a temporary storage area such as a main memory and a work area of the CPU 201. A flash memory 204 is a nonvolatile storage medium for storing various types of data such as pictures and electronic documents. An operating system (OS) 310 and a print application 300 (described below) are also stored in the flash memory 204.

In the mobile terminal 100, the single CPU 201 executes various types of processing illustrated in the flowcharts (described below). However, other configurations can be employed. For example, a plurality of CPUs can execute various types of processing illustrated in the flowcharts (described below) in a cooperative manner. Part of the processing of the flowcharts (described below) can be executed by using a hardware circuit such as an application specific integrated circuit (ASIC).

An operation panel 205 includes a touch panel function that detects a user's touch operations. The operation panel 205 displays various screens provided by the OS 310 and the print application 300. The user can input touch operations to the operation panel 205 to input desired operation instructions to the mobile terminal 100. The mobile terminal 100 can include hardware keys (not illustrated), and the user can input operation instructions to the mobile terminal 100 by using the hardware keys.

A speaker 206 and a microphone 207 are used when the user has a voice conversation via the mobile phone. A camera 208 captures an image according to the user's imaging instructions. A picture captured by the camera 208 is stored in a predetermined area of the flash memory 204.

A Bluetooth® interface (I/F) performs Bluetooth® wireless communication. The Bluetooth® I/F 209 is compliant with the BLE standard.

A wireless LAN I/F 210 performs Wi-Fi® wireless communication. The wireless LAN I/F 210 connects to an external access point to execute Wi-Fi® wireless communication. The external access point can be the printing apparatus 110 operating in the access point mode, or an access point apparatus with a router function.

Figure 3:
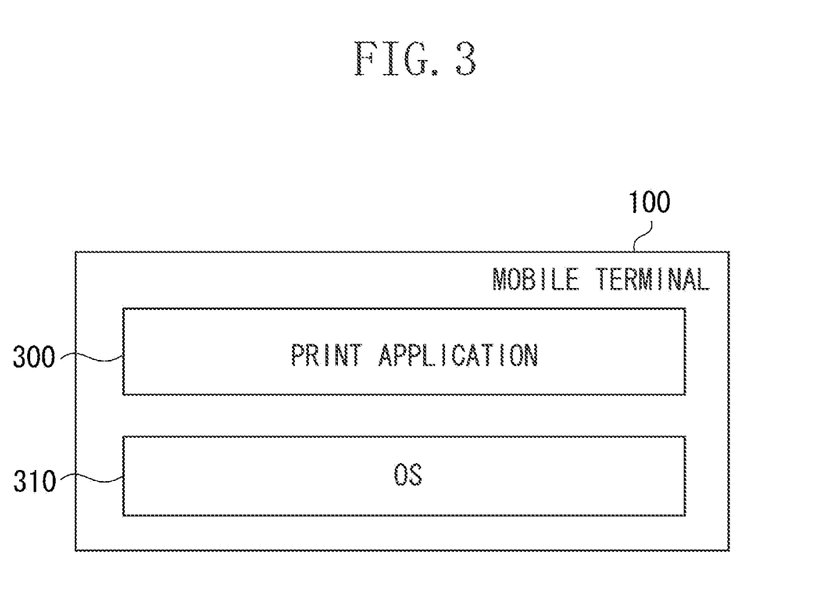
FIG. 3 is a block diagram illustrating a software configuration of the mobile terminal.

Referring to FIG. 3, a software configuration of the mobile terminal 100 will be described. FIG. 3 is a functional block diagram of software implemented by the CPU 201 reading control programs stored in the ROM 202 and/or the flash memory 204.

The OS 310 is basic software for controlling the entire mobile terminal 100. Various applications, including the print application 300 (described below), can be installed in the mobile terminal 100. The OS 310 exchanges information with the applications, and changes a screen displayed on the operation panel and controls wireless communications by the Bluetooth® I/F 209 and the wireless LAN I/F 210 according to instructions received from the applications.

The print application 300 is an application installed in the mobile terminal 100. Although not illustrated in FIG. 3, various applications can be installed in the mobile terminal 100 in addition to the print application 300. The print application 300 provides a print function to the user of the mobile terminal 100. The print application 300 manages a plurality of printing apparatuses in the form of a device list. The user of the mobile terminal 100 uses the device list to select a desired printing apparatus.

Referring to FIGS. 4A, 4B, 4C, and 4D, details of screens which the print application 300 provides to the user and a method for registering a new device (printing apparatus) in the device list managed by the print application 300 will be described.

Figure 4A:
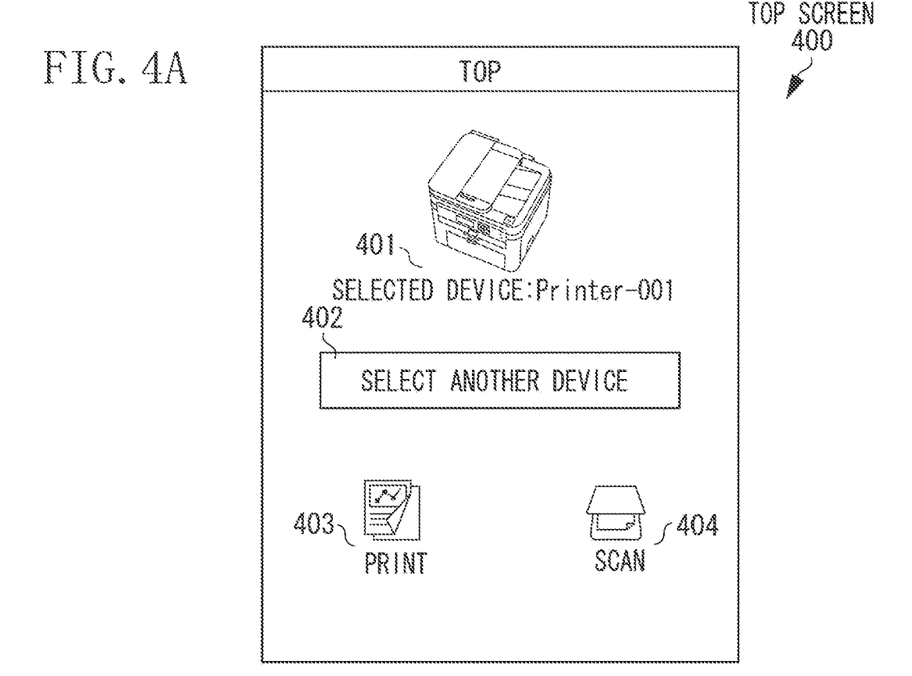
FIGS. 4A, 4B, 4C, and 4D are diagrams illustrating screens provided by a print application.

FIG. 4A illustrates a top screen 400 initially displayed on the operation panel 205 when the print application 300 is activated. When the print application 300 is activated, the print application 300 requests the OS 310 to display the top screen 400. The OS 310 displays the top screen 400 on the operation panel 205.

The top screen 400 displays a currently selected device (printing apparatus) in a field 401. The print application 300 can transmit print data to the selected device displayed in the field 401, and use a scan function of the selected device. In the case of the top screen 400, a printing apparatus having a device name "Printer-001" is displayed as the selected device.

An icon 403 is an icon for transmitting print data to the selected device. When the user selects (e.g., in a case of a touch panel, a touch operation on the touch panel) the icon 403, the print application 300 displays a list screen of pictures and electronic documents stored in the mobile terminal 100. When the user selects a desired file from the list screen, the print application 300 generates print data for printing the file selected by the user, and transmits the generated print data to the selected device by using Wi-Fi® wireless communication. The device displayed in the field 401 serves as the transmission destination of the print data.

An icon 404 is an icon for using the scan function of the selected device. When the user selects the icon 404, the print application 300 displays a scan setting screen for the user to make scan settings, such as scan resolution and monochrome/color setting. When the user makes scan settings on the scan setting screen and inputs a scan execution instruction, the print application 300 transmits the scan execution instruction to the selected device via Wi-Fi®. The print application 300 then obtains a scan image generated by the scanning by the selected device via Wi-Fi®.

The user can select an icon 402 to change the selected device in the field 401. If the user selects the icon 402, the print application 300 displays a device list screen 410 illustrated in FIG. 4B. The device list screen 410 is a screen for presenting the device list managed by the print application 300 to the user. The user can select a desired device from a field 411. The device selected by the user from the field 411 is displayed as a selected device in the field 401 of the top screen 400.

Figure 4B:
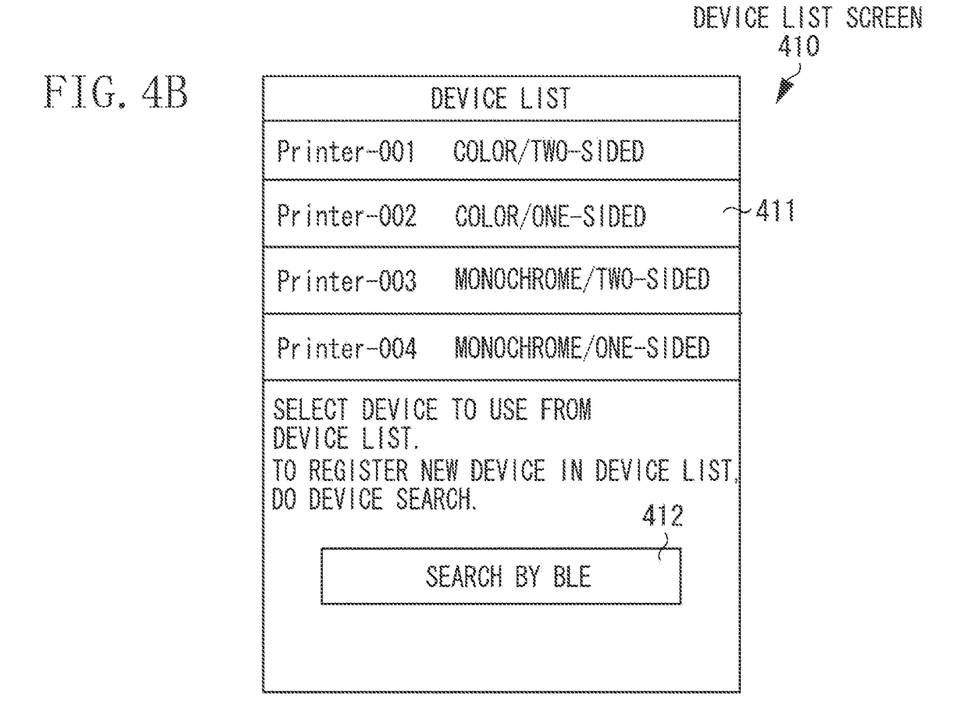
Figure 5:
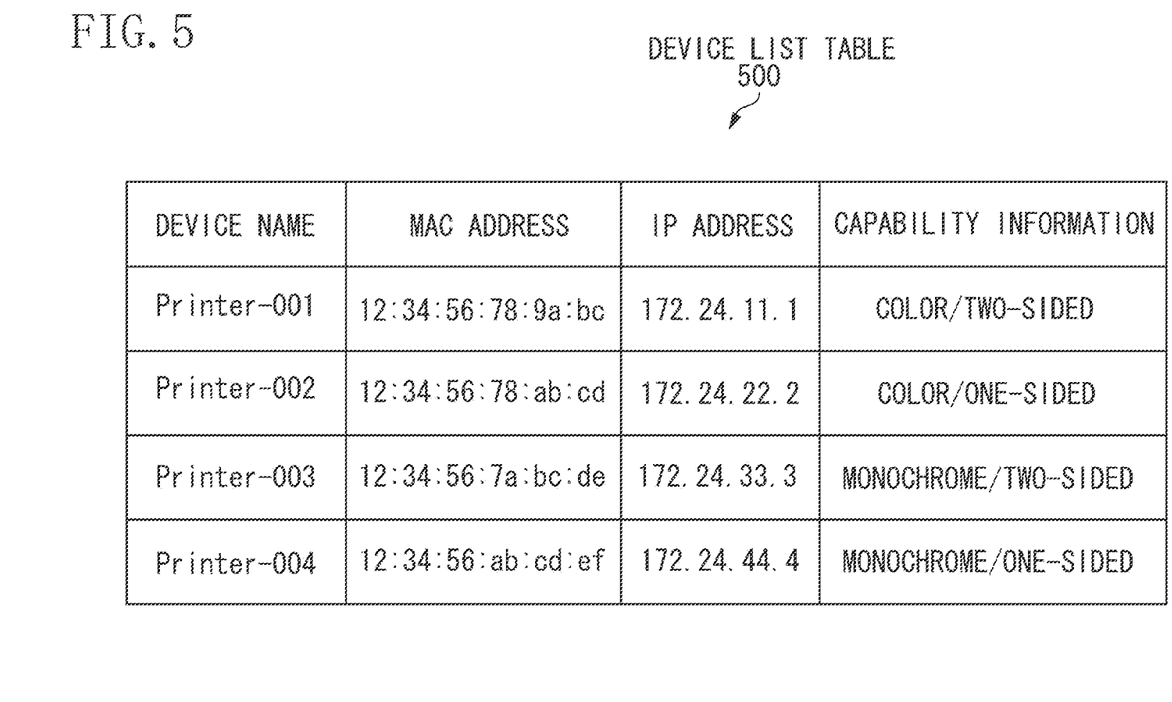
FIG. 5 illustrates a configuration of a device list table.

FIG. 5 illustrates details of the device list. A device list table 500 in FIG. 5 is information indicating the device list managed by the print application 300. The device list table 500 is stored in the flash memory 204 of the mobile terminal 100. The device list screen 410 is displayed based on the information of the device list table 500.

The device list table 500 includes a device name, a media access control (MAC) address, an Internet Protocol (IP) address, and capability information. The device name indicates the name of a device. A name set by the user or a model name can be used. The MAC address and the IP address indicate the MAC address and the IP address of each device. The capability information is information indicating the capabilities of the device. In the present exemplary embodiment, the capability information indicates whether the device can perform color printing and two-sided printing.

If there is no desired device in the device list screen 410, the user needs to search for and register a desired device into the device list. The user can select an icon 412 to register a new device in the device list. In the present exemplary embodiment, devices around the mobile terminal 100 (hereinbelow, referred to as "surrounding devices") are searched for by using BLE, and the user selects a desired device from the search results and registers the new device in the device list.

When the user selects the icon 412 on the device list screen 410, the print application 300 searches for surrounding devices by using BLE. In the present exemplary embodiment, surrounding devices (e.g., the printing apparatus 110) are periodically broadcasting an advertising packet of BLE. The print application 300 performs reception of the advertising packet for a predetermined time to search for surrounding devices by using BLE.

Figure 4C:
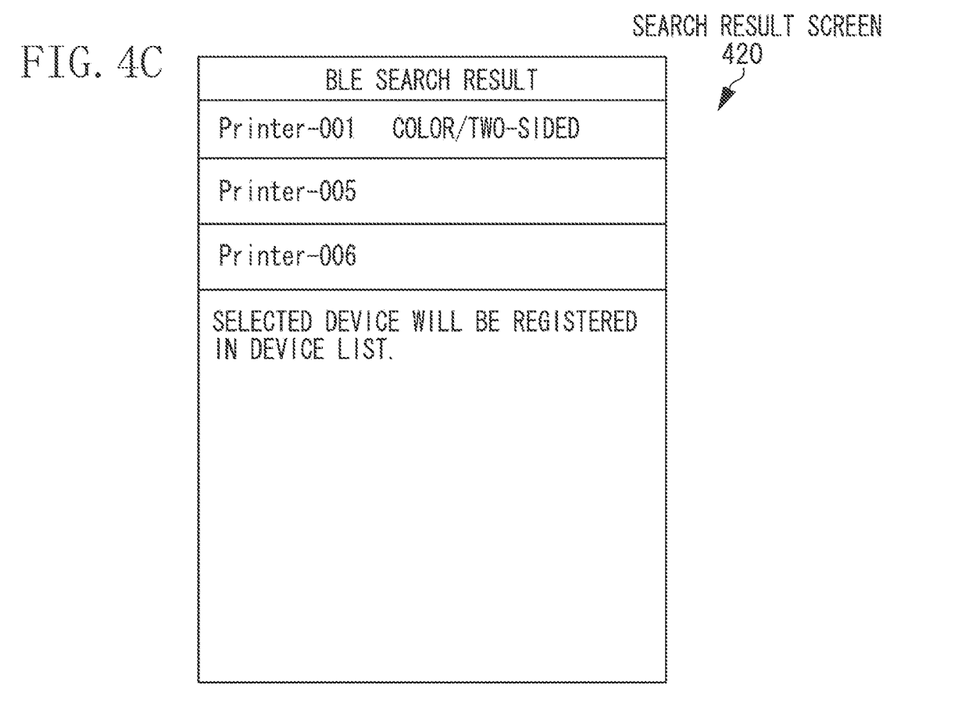

When the searching of surrounding devices by using BLE is completed, the print application 300 displays a search result screen 420 illustrated in FIG. 4C. The search result screen 420 illustrates search results when, for example, three devices are found.

In the present exemplary embodiment, an advertising packet transmitted from a surrounding device includes a device name and a MAC address. Since an advertising packet can only contain information of limited data size, an IP address and capability information are not included. The search result screen 420 displays search results "Printer-005" and "Printer-006" by using the device names included in the advertising packets. A search result "Printer-001" is displayed with its capability information as well. The reason is that the information about the device having the device name "Printer-001" is stored in the device list table 500, and the search result is displayed by using the information of the device list table 500. In other words, according to the present exemplary embodiment, the search results are displayed not just by using the information included in the advertising packets. If a device has previously been registered in the device list, the search result thereof can be displayed by using the information registered in the device list. The user can know the detailed information about the searched devices if the devices are registered in the device list.

If the user selects a desired device on the search result screen 420, the device information about the selected device is registered into the device list. In the present exemplary embodiment, the advertising packet of BLE includes no IP address and no capability information. When registering a new device in the device list, the print application 300 obtains the IP address and the capability information from the user-selected device via Wi-Fi®, and registers the device information obtained via Wi-Fi® in the device list. This processing will be described in detail below with reference to the flowchart in FIG. 9. If the user selects a device already registered in the device list on the search result screen 420, the registration into the device list will not be performed.

Figure 4D:
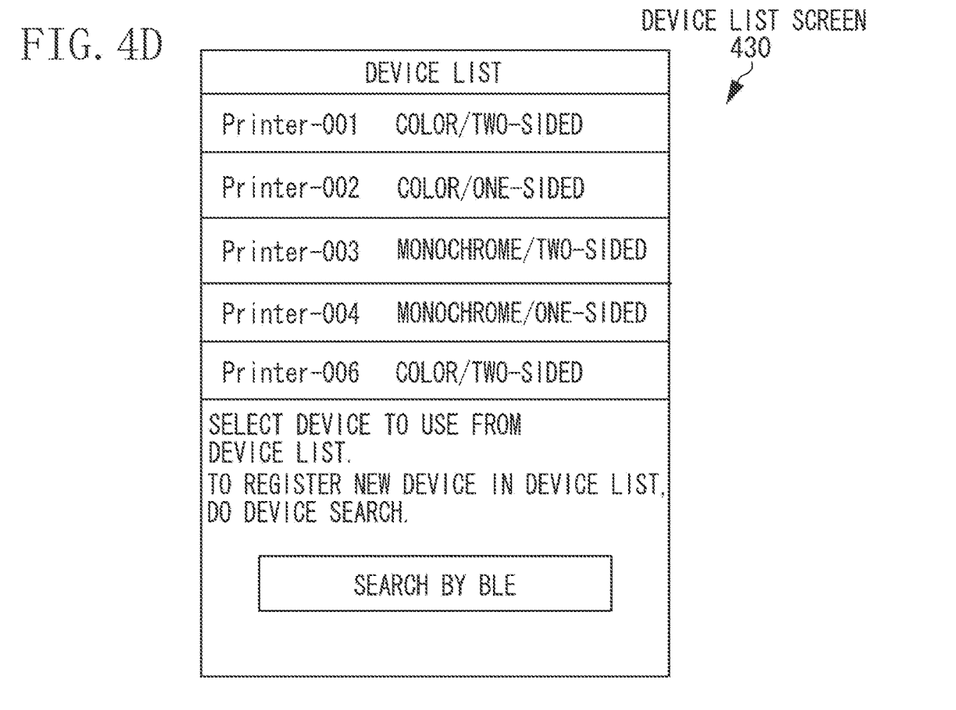

FIG. 4D illustrates a device list screen 430 that is displayed by the print application 300 after the new device "Printer-006" on the search result screen 420 is registered. A comparison with the device list screen 410 of FIG. 4B shows that the device "Printer-006" is newly added to the device list.

Figure 6:
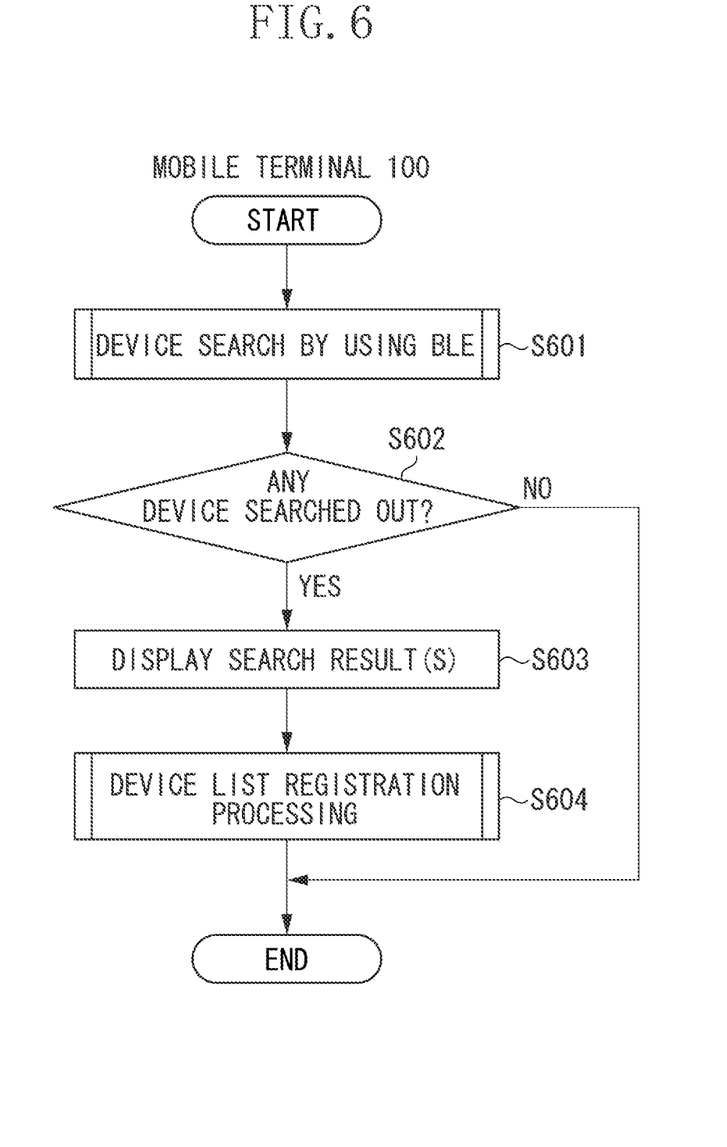
FIG. 6 is a flowchart illustrating an entire flow of processing executed by the print application.
Figure 7:
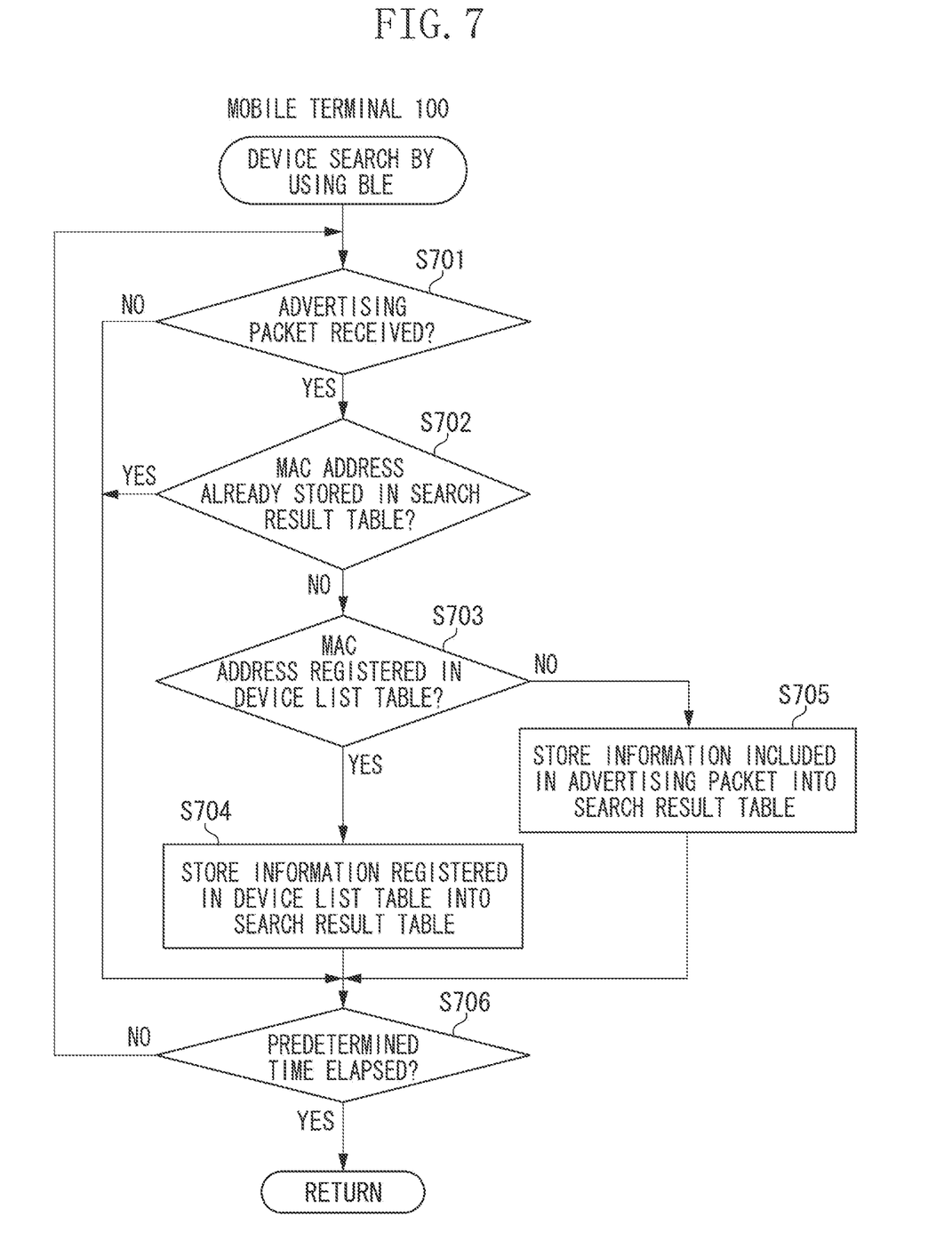
FIG. 7 is a flowchart illustrating a flow of a device search using Bluetooth® low energy (BLE).
Figure 9:
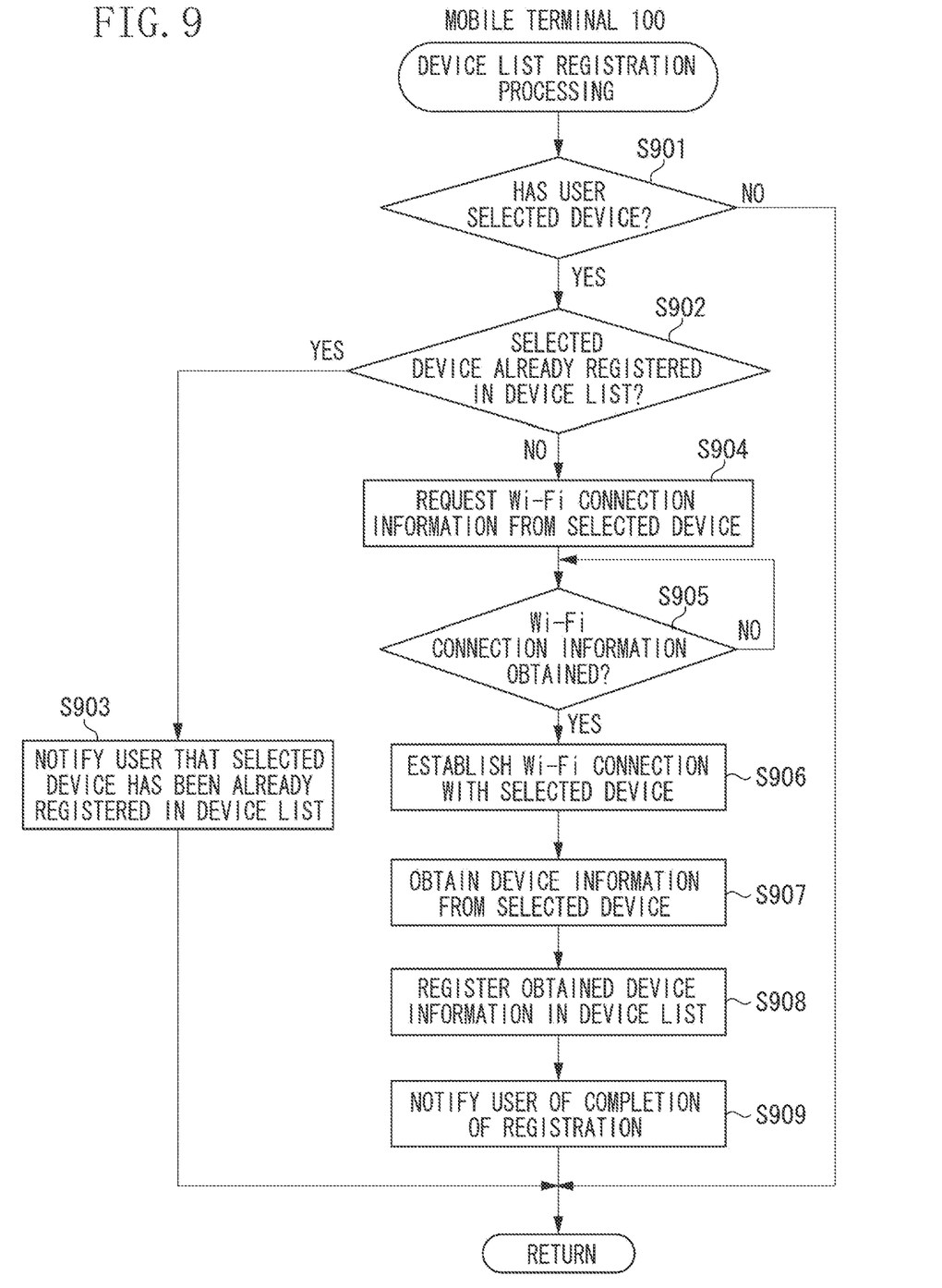
FIG. 9 is a flowchart illustrating a flow of device list registration processing.

Next, processing that the mobile terminal 100 executes in searching for surrounding devices by BLE and registering a new device in the device list managed by the print application 300 will be described in detail with reference to the flowcharts illustrated in FIGS. 6, 7, and 9. The steps of the flowcharts in FIGS. 6, 7, and 9 are implemented by the CPU 201 loading the control programs stored in the memories, such as the ROM 202, into the RAM 203 and executing the control programs.

The user selects the icon 412 on the device list screen 410 to input a device search instruction to the print application 300. If the device search instruction is input, then in step S601, the print application 300 executes a device search by using BLE.

The processing executed in step S601 will be described in detail with reference to FIG. 7. In step S701, the print application 300 determines whether an advertising packet of BLE is received. If an advertising packet has been received by the Bluetooth® I/F 209 (YES in step S701), the processing proceeds to step S702. If no advertising packet has been received by the Bluetooth® I/F 209 (NO in step S701), the processing proceeds to step S706. The processing performed by the print application 300 executed in step S701 is that implemented by the CPU 201.

Figure 8:
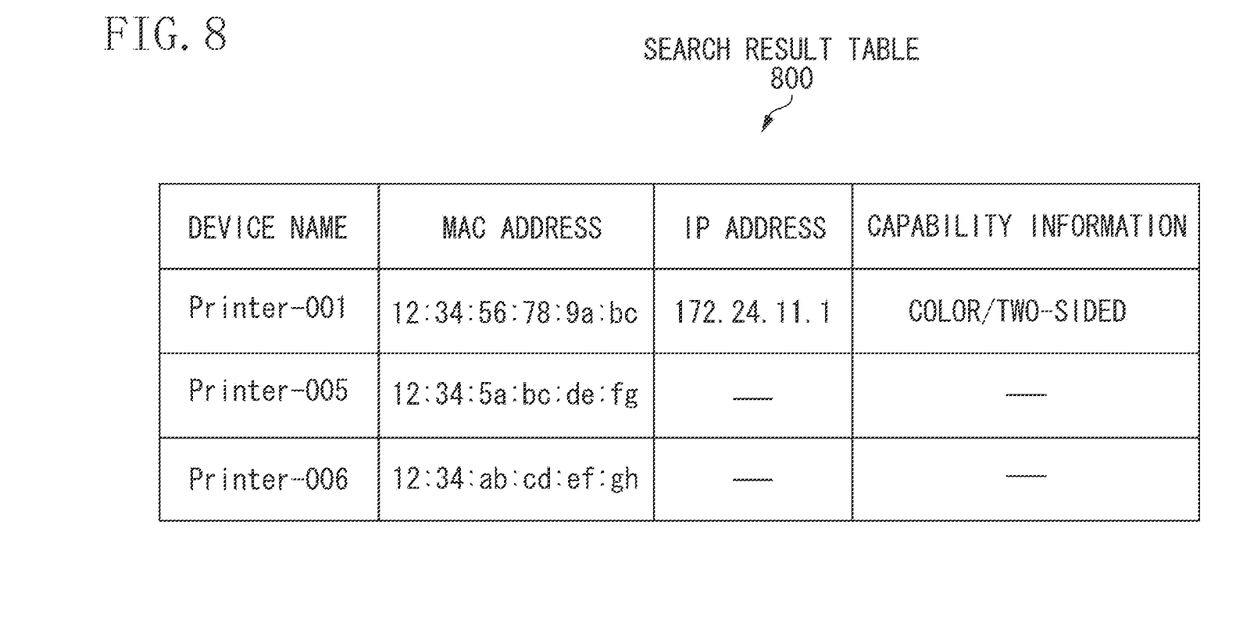
FIG. 8 illustrates a configuration of a search result table.

In step S702, the print application 300 determines whether the sender device of the received advertising packet (newly searched device) has previously been stored in a search result table. FIG. 8 illustrates a search result table 800 that is information indicating search results. The search result table 800 is stored in the flash memory 204 of the mobile terminal 100. Search results (described below) are displayed based on the search result table 800. The advertising packet according to the present exemplary embodiment includes the MAC address and the device name of the sender device. In step S702, the print application 300 determines whether the MAC address (device identification information) included in the advertising packet has previously been stored in the search result table 800. If the MAC address included in the advertising packet has previously been stored in the search result table 800 (YES in step S702), the processing proceeds to step S706. If the MAC address included in the advertising packet has not been stored in the search result table 800 (NO in step S702), the processing proceeds to step S703. The processing of the print application 300 executed in step S702 is implemented by the CPU 201.

In step S703, the print application 300 determines whether the device searched by BLE has previously been registered in the device list. In the present exemplary embodiment, the print application 300 determines whether the MAC address included in the advertising packet has been registered in the device list table 500 in FIG. 5. If the MAC address included in the advertising packet has been registered in the device list table 500 (YES in step S703), the processing proceeds to step S704. If the MAC address included in the advertising packet has not been registered in the device list table 500 (NO in step S703), the processing proceeds to step S705. The processing of the print application 300 executed in step S703 is implemented by the CPU 201.

Next, processing performed in step S704 will be described. In step S704, the print application 300 stores information registered in the device list table 500 into the search result table 800. For example, if the MAC address included in the advertising packet is "12:34:56:78:9a:bc," the print application 300 stores device information about a device having the MAC address ""12:34:56:78:9a:bc" from among the pieces of information registered in the device list table 500 into the search result table 800. This operation enables the user to comprehend the information not included in the advertising packet (i.e., in the present exemplary embodiment, the IP address and the capability information) from the search result. The processing of the print application 300 executed in step S704 is implemented by the CPU 201.

Next, processing performed in Step S705 will be described. In step S705, the print application 300 stores the information included in the advertising packet (i.e., in the present exemplary embodiment, the device name and the MAC address) into the search result table 800. The processing of the print application 300 executed in step S705 is implemented by the CPU 201.

Next, processing performed in step S706 will be described. In step S706, the print application 300 determines whether a predetermined time (e.g., five seconds) has elapsed since the start of the device search using BLE. If the predetermined time has not elapsed since the start of the device search using BLE (NO in step S706), the processing returns to step S701 and the print application 300 waits for the reception of a next advertising packet. If the predetermined time has elapsed since the start of the device search using BLE (YES in step S706), the print application 300 ends the device search using BLE. The processing proceeds to step S602 in FIG. 6. The processing of the print application 300 executed in step S706 is implemented by the CPU 201.

Processing performed in step S602 in FIG. 6 will now be described. In step S602, the print application 300 determines whether any device is found by the device search in step S601. If no device information is stored in the search result table 800, the print application 300 determines that no device is found (NO in step S602) and the processing ends without displaying a search result. If device information is stored in the search result table 800, the print application 300 determines that a device has been found (YES in step S602) and the processing proceeds to step S603. The processing of the print application 300 executed in step S602 is implemented by the CPU 201.

Next, processing performed in step S603 will be described. In step S603, the print application 300 displays the search result of the device search in step S601. More specifically, the print application 300 generates a search result screen based on the search result table 800, and requests the OS 310 to display the search result screen. The OS 310 displays the search result screen on the operation panel 205. For example, the search result screen 420 illustrated in FIG. 4C is displayed as the search result screen displayed at this time. The processing of the print application 300 executed in step S603 is implemented by the CPU 201.

In step S604, the print application 300 performs device list registration processing for registering a new device in the device list.

The processing executed in step S604 will be described in detail with reference to FIG. 9. In step S901, the print application 300 determines whether the user has selected a device from the search result. If the user has selected a device from the search result (YES in step S901), the processing proceeds to step S902. If the user has not selected a device from the search result within a predetermined time or if the user inputs an end instruction (NO in step S901), the processing in the flowchart ends. The processing of the print application 300 executed in step S901 is implemented by the CPU 201.

Next, processing performed in step S902 will be described. In step S902, the print application 300 determines whether the selected device selected by the user has previously been registered in the device list. In the present exemplary embodiment, the print application 300 determines whether the MAC address (device identification information) of the selected device selected by the user has been registered in the device list table 500. If the MAC address of the selected device selected by the user has been registered in the device list table 500 (YES in step S902), the processing proceeds to step S903. If the MAC address of the selected device selected by the user has not been registered in the device list table 500 (NO in step S902), the processing proceeds to step S904. The processing of the print application 300 executed in step S902 is implemented by the CPU 201.

Next, processing performed in step S903 will be described. In step S903, the print application 300 notifies the user that the selected device selected by the user has previously been registered in the device list. More specifically, the print application 300 generates a notification screen for notifying the user that the selected device has previously been registered in the device list. The print application 300 requests the OS 310 to display the generated notification screen. The OS 310 displays the notification screen for notifying the user that the selected device has previously been registered in the device list on the operation panel 205. The processing of the print application 300 executed in step S903 is implemented by the CPU 201.

Next, processing performed in step S904 will be described. In step S904, the print application 300 requests Wi-Fi® connection information from the selected device. The purpose of requesting Wi-Fi® connection information from the selected device is to obtain information not obtained from the advertising packet of BLE via Wi-Fi®. The request for Wi-Fi® connection information is made by the Bluetooth® I/F 209 via BLE. In step S904, the print application 300 instructs the selected device (e.g., the printing apparatus 110) to start operating in the access point mode. The instruction is issued by the OS 310 in response to the request of the print application 300 to the OS 310. The processing of the print application 300 executed in step S904 is implemented by the CPU 201.

In step S905, the print application 300 determines whether Wi-Fi® connection information has been obtained from the selected device. The selected device operating in the access point mode generates and passes a service set identifier (SSID) and a connection key (e.g., a Wired Equivalent Privacy (WEP) key) to the mobile terminal 100 via BLE. The SSID and the connection key constitute the Wi-Fi® connection information according to the present exemplary embodiment. The Wi-Fi® connection information obtained by the mobile terminal 100 from the selected device is obtained by the print application 300 via the OS 310. If the print application 300 obtains the Wi-Fi® connection information (YES in step S905), the processing proceeds to step S906. The processing of the print application 300 executed in step S905 is implemented by the CPU 201.

In step S906, the print application 300 establishes a Wi-Fi® connection with the selected device. The print application 300 requests the OS 310 to establish the Wi-Fi® connection by using the obtained Wi-Fi® connection information. Then, the OS 310 causes the wireless LAN I/F 210 to establish the Wi-Fi® connection with the selected device. The processing of the print application 300 executed in step S906 is implemented by the CPU 201.

In step S907, the print application 300 obtains device information from the selected device via Wi-Fi®. The print application 300 requests the OS 310 to obtain the device information from the selected device via Wi-Fi®. Then, the OS 310 causes the wireless LAN I/F 210 to obtain the device information from the selected device via Wi-Fi®. The device information obtained in step S907 includes the device name, the MAC address, the IP address, and the capability information. The device information obtained by the OS 310 is passed to the print application 300. The processing of the print application 300 executed in step S907 is implemented by the CPU 201.

In step S908, the print application 300 registers the device information obtained from the selected device in the device list. More specifically, the print application 300 registers the device information obtained in step S907 into the device list table 500 as a new record. The processing of the print application 300 executed in step S908 is implemented by the CPU 201.

The device newly registered in the device list in step S908 is displayed in the field 401 of the top screen 400 and set as the selected device. Based on the processing of step S906, the mobile terminal 100 is brought to a state where a Wi-Fi® connection is established with the newly registered device. From the viewpoint of the user, convenience improves because print data can immediately be transmitted to the new device and the scan function provided by the new device can immediately be used when the new device is registered in the device list. If the selected device selected by the user from the search results has previously been registered in the device list, the selected device is also displayed in the field 401 of the top screen 400 and set as the selected device.

In step S909, the print application 300 notifies the user of completion of registration of the new device in the device list. More specifically, the print application 300 generates a completion screen indicating the completion of registration. Then, the print application 300 requests the OS 310 to display the generated completion screen. The OS 310 displays the completion screen on the operation panel 205. The processing of the print application 300 executed in step S909 is implemented by the CPU 201.

As described above, according to the present exemplary embodiment, two wireless communication systems, such as Bluetooth® (BLE) and Wi-Fi®, can be combined to register a new device in the device list. More specifically, the mobile terminal 100 performs a device search by using Bluetooth® (BLE), and presents search result to the user. If the user selects a desired device from the search result, the mobile terminal 100 establishes a Wi-Fi® connection with the selected device selected by the user, and obtains device information from the selected device via Wi-Fi®. Then, the mobile terminal 100 registers the device information obtained via Wi-Fi® as a new device in the device list.

According to the present exemplary embodiment, if the selected device selected by the user has previously been registered in the device list, the mobile terminal 100 ends the processing without obtaining the device information again. This operation can prevent the occurrence of time wasted for obtaining the device information via Wi-Fi®.

While the examples of the device information include the device name, the MAC address, the IP address, and the capability information, the device information is not limited to such examples. Other pieces of information can be employed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

What is claimed is:

1. A communication system comprising:
a terminal; and
a device,
wherein the terminal comprises:
a processor; and
a memory that stores a program, wherein the processor executes the program to perform:
executing a device search that searches for devices by using Bluetooth communication;
displaying a result of the search, wherein the searched-for plurality of devices displayed in the result of the search include a device that has not already been operating as an access point of a wireless LAN connection if the device that has not already been operating as the access point of the wireless LAN connection is found by the search;
transmitting, via the Bluetooth communication, a request of connection information about the access point of the wireless LAN connection to one device selected from the result of the search;
obtaining, via the Bluetooth communication, the connection information about the access point of the wireless LAN connection passed from the selected one device; and
establishing the wireless LAN connection with the selected one device based on the obtained connection information,
wherein the selected one device performs:
starting operating as the access point of the wireless LAN connection according to the request if the selected one device has not already been operating as the access point of the wireless LAN connection when the selected one device receives the request from the terminal; and passing the connection information about the started access point of the wireless LAN connection to the terminal via the Bluetooth communication.

2. The communication system according to claim 1, wherein the processor executes the program to further perform: obtaining device information from the device selected from the result of the search via the established wireless LAN connection.

3. The communication system according to claim 2, wherein the obtained device information is registered in a device list managed by the terminal.

4. The communication system according to claim 2, wherein the device information includes at least capability information about the device selected from the result of the search.

5. The communication system according to claim 1,
wherein the Bluetooth communication is communication based on Bluetooth Low Energy (BLE), and
wherein the searching is performed by receiving an advertising packet of BLE.

6. The communication system according to claim 5, wherein the displaying of the result of the search is performed based on information included in the advertising packet.

7. The communication system according to claim 6, wherein the information included in the advertising packet is a device name.

8. The communication system according to claim 1, wherein the connection information includes at least a service set identifier (SSID).

9. A terminal comprises:
a processor; and
a memory that stores a program, wherein the processor executes the program to perform:
executing a device search that searches for devices by using Bluetooth communication;
displaying a result of the search, wherein the searched-for plurality of devices displayed in the result of the search include a device that has not already been operating as an access point of a wireless LAN connection if the device that has not already been operating as the access point of the wireless LAN connection is found by the search;
transmitting, via the Bluetooth communication, a request of connection information about the access point of the wireless LAN connection to one device selected from the result of the search;
obtaining, via the Bluetooth communication, the connection information about the access point of the wireless LAN connection passed from the selected one device; and
establishing the wireless LAN connection with the selected one device based on the obtained connection information,
wherein, if the selected one device has not already been operating as the access point of the wireless LAN connection when the selected one device receives the request from the terminal, the selected one device starts operating as the access point of the wireless LAN connection according to the request and passes the connection information about the access point of the wireless LAN connection to the terminal via the Bluetooth communication.

10. A method executed by a communication system that comprises a terminal and a device, the method comprising:
executing, by the terminal, a device search that searches for devices by using Bluetooth communication;
displaying, by the terminal, a result of the search, wherein the searched- for plurality of devices displayed in the result of the search include a device that has not already been operating as an access point of a wireless LAN connection if the device that has not already been operating as the access point of the wireless LAN connection is found by the search;
transmitting, by the terminal via the Bluetooth communication, a request of connection information about the access point of the wireless LAN connection to one device selected by a user from the result of the search;
starting, by the selected one device, the wireless LAN connection according to the request if the selected one device has not already been operating as the access point of the wireless LAN connection;
passing, by the selected one device, the connection information about the access point of the wireless LAN connection to the terminal via the Bluetooth communication;
obtaining, by the terminal via the Bluetooth communication, the connection information about the access point of the wireless LAN connection passed from the selected one device; and
establishing the wireless LAN connection with the selected one device based on the obtained connection information.

11. A method for controlling a terminal, the method comprising:
executing a device search that searches for devices by using Bluetooth communication;
displaying a result of the search, wherein the searched-for plurality of devices displayed in the result of the search include a device that has not already been operating as an access point of a wireless LAN connection if the device that has not already been operating as the access point of the wireless LAN connection is found by the search;
transmitting, via the Bluetooth communication, a request of connection information about the access point of the wireless LAN connection to one device selected from the result of the search;
obtaining, via the Bluetooth communication, the connection information about the access point of the wireless LAN connection passed from the selected one device; and
establishing the wireless LAN connection with the selected one device based on the obtained connection information,
wherein, if the selected one device has not already been operating as the access point of the wireless LAN connection when the selected one device receives the request from the terminal, the selected one device starts operating as the access point of the wireless LAN connection according to the request and passes the connection information about the access point of the wireless LAN connection to the terminal via the Bluetooth communication.

12. A non-transitory computer readable storage medium storing computer executable instructions for causing a computer to perform:
executing a device search that searches for devices by using Bluetooth communication;

displaying a result of the search, wherein the searched-for plurality of devices displayed in the result of the search include a device that has not already been operating as an access point of a wireless LAN connection if the device that has not already been operating as the access point of the wireless LAN connection is found by the search;

transmitting, via the Bluetooth communication, a request of connection information about the access point of the wireless LAN connection to one device selected from the result of the search;

obtaining, via the Bluetooth communication, the connection information about the access point of the wireless LAN connection passed from the selected one device; and establishing the wireless LAN connection with the selected one device based on the obtained connection information, wherein, if the selected one device has not already been operating as the access point of the wireless LAN connection when the selected one device receives the request, the selected one device starts operating as the access point of the wireless LAN connection according to the request and passes the connection information about the access point of the wireless LAN connection to the computer via the Bluetooth communication.

13. The non-transitory computer readable storage medium according to claim 12, wherein the computer executable instructions causes the computer to further perform: obtaining device information from the device selected from the result of the search via the established wireless LAN connection.

14. The non-transitory computer readable storage medium according to claim 12,
wherein the Bluetooth communication is communication based on Bluetooth Low Energy (BLE), and
wherein the searching is performed by receiving an advertising packet of BLE, and
wherein the displaying of the result of the search is performed based on information included in the advertising packet.

15. A terminal comprising:
a processor; and
a memory that stores a program, wherein the processor executes the program to perform:
searching for a plurality of devices by using Bluetooth communication;
displaying a list of the plurality of devices found as a result of the search, wherein the searched-for plurality of devices displayed in the displayed list include a first device that does not operate as an access point of a wireless LAN connection yet;
transmitting, via the Bluetooth communication, a request to the first device that is selected by a user from the displayed list;
obtaining, via the Bluetooth communication, connection information about a wireless LAN connection from the first device that starts operating as the access point of the wireless LAN connection according to the transmitted request; and
establishing the wireless LAN connection with the first device based on the obtained connection information.

16. The terminal according to claim 15, wherein the request is transmitted to the first device in a case where information of the first device has not been registered yet in a device list managed by the terminal.

17. The terminal according to claim 16, wherein the processor executes the program to further perform obtaining the information of the first device from the first device via the established wireless LAN connection.

18. The terminal according to claim 17, wherein the processor executes the program to further perform registering the obtained information in the device list managed by the terminal.

19. The terminal according to claim 18, wherein the processor executes the program to further perform displaying the list of the searched-for plurality of devices as the result of the search using the information being registered in the device list and information included in the received advertising packets.

20. The terminal according to claim 17, wherein the obtained information includes at least capability information about the first device.

21. The terminal according to claim 15, wherein the searching for the plurality of devices is performed by receiving advertising packets of BLE (Bluetooth Low Energy) from the plurality of devices, and
wherein the result of the search is displayed based on information included in the advertising packet.

22. The terminal according to claim 21, wherein the information included in the advertising packet is a device name.

23. The terminal according to claim 15, wherein the connection information includes at least a service set identifier (SSID).

24. A method for controlling a terminal, the method comprising:
searching for a plurality of devices by using Bluetooth communication;
displaying a list of the plurality of devices found as a result of the search, wherein the searched-for plurality of devices displayed in the displayed list include a first device that does not operate as an access point of a wireless LAN connection yet;
transmitting, via the Bluetooth communication, a request to the first device that is selected by a user from the displayed list;
obtaining, via the Bluetooth communication, connection information about a wireless LAN connection from the first device that starts operating as the access point of the wireless LAN connection according to the transmitted request; and
establishing the wireless LAN connection with the first device based on the obtained connection information.

25. A non-transitory computer readable storage medium storing computer executable instructions for causing a computer to perform:
searching for a plurality of devices by using Bluetooth communication;
displaying a list of the plurality of devices found as a result of the search, wherein the searched-for plurality of devices displayed in the displayed list include a first device that does not operate as an access point of a wireless LAN connection yet;
transmitting, via the Bluetooth communication, a request to the first device that is selected by a user from the displayed list;
obtaining, via the Bluetooth communication, connection information about a wireless LAN connection from the first device that starts operating as the access point of the wireless LAN connection according to the transmitted request; and establishing the wireless LAN connection with the first device based on the obtained connection information.

* * * * *